(12) United States Patent
Deng et al.

(10) Patent No.: US 10,112,301 B2
(45) Date of Patent: Oct. 30, 2018

(54) AUTOMATIC CALIBRATION METHOD FOR ROBOT SYSTEMS USING A VISION SENSOR

(71) Applicants: Tyco Electronics (Shanghai) Co. Ltd., Shanghai (CN); Tyco Electronics Corporation, Berwyn, PA (US)

(72) Inventors: Yingcong Deng, Shanghai (CN); Dandan Zhang, Shanghai (CN); Roberto Francisco-yi Lu, Bellevue, WA (US); Lvhai Hu, Shanghai (CN)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 50 days.

(21) Appl. No.: 15/233,440

(22) Filed: Aug. 10, 2016

(65) Prior Publication Data

US 2016/0346932 A1    Dec. 1, 2016

Related U.S. Application Data

(63) Continuation of application No. PCT/IB2015/050707, filed on Jan. 30, 2015.

(30) Foreign Application Priority Data

Feb. 11, 2014   (CN) .......................... 2014 1 0047115

(51) Int. Cl.
B25J 9/16    (2006.01)

(52) U.S. Cl.
CPC ... B25J 9/1692 (2013.01); *G05B 2219/39011* (2013.01); *G05B 2219/39026* (2013.01); *G05B 2219/40557* (2013.01)

(58) Field of Classification Search
CPC ......... B25J 9/1692; G05B 2219/40557; G05B 2219/39011; G05B 2219/39026
(Continued)

(56) References Cited

U.S. PATENT DOCUMENTS

| 4,305,130 A | * | 12/1981 | Kelley | ................... B25J 19/023 |
| | | | | 318/640 |
| 4,402,053 A | * | 8/1983 | Kelley | ................. B23P 19/004 |
| | | | | 414/730 |

(Continued)

FOREIGN PATENT DOCUMENTS

| DE | 10150225 A1 | 4/2003 |
| EP | 2199036 A2 | 6/2010 |

OTHER PUBLICATIONS

PCT International Search Report and Written Opinion, dated May 5, 2015, 3 pages.

(Continued)

*Primary Examiner* — Jaime Figueroa
(74) *Attorney, Agent, or Firm* — Barley Snyder

(57) ABSTRACT

An automatic calibration method for a robot system is disclosed. The automatic calibration method for a robot system includes the steps of calibrating a sensor and a sensor coordinate system of the sensor with respect to a world coordinate system, controlling a robot under the guidance of the sensor to move a point of a tool mounted on the robot to reach a same target point with a plurality of different poses, the point of the tool in a tool coordinate system, and calculating a transformation matrix $^{tcp}T_t$ of the tool coordinate system with respect to a tool center point coordinate system based on pose data of the robot at the same target point.

20 Claims, 2 Drawing Sheets

(58) Field of Classification Search
USPC .................................................. 700/245, 254
See application file for complete search history.

(56) References Cited

U.S. PATENT DOCUMENTS

| | | | | |
|---|---|---|---|---|
| 5,297,238 | A * | 3/1994 | Wang | B25J 9/1692 700/254 |
| 5,523,663 | A * | 6/1996 | Tsuge | B25J 9/162 318/568.16 |
| 6,611,617 | B1 * | 8/2003 | Crampton | G01B 11/2518 356/614 |
| 8,073,528 | B2 * | 12/2011 | Zhao | B25J 9/1689 600/424 |
| 8,135,208 | B1 * | 3/2012 | Vangal-Ramamurthy | G06T 7/80 348/E17.002 |
| 8,180,487 | B1 * | 5/2012 | Vangal-Ramamurthy | B25J 9/1692 219/121.78 |
| 9,393,694 | B2 * | 7/2016 | Wallack | B25J 9/1692 |
| 9,517,468 | B2 * | 12/2016 | Haddad | B01L 3/56 |
| 2008/0188983 | A1 * | 8/2008 | Ban | B25J 9/1692 700/245 |
| 2008/0188986 | A1 * | 8/2008 | Hoppe | B25J 9/1692 700/263 |
| 2009/0118864 | A1 | 5/2009 | Eldridge et al. | |
| 2010/0111370 | A1 * | 5/2010 | Black | G06K 9/00369 382/111 |
| 2010/0141776 | A1 * | 6/2010 | Ban | B25J 9/1692 348/187 |
| 2010/0168915 | A1 * | 7/2010 | Kagawa | B25J 9/1692 700/254 |
| 2011/0218675 | A1 * | 9/2011 | Ban | B25J 9/1697 700/259 |
| 2012/0143370 | A1 * | 6/2012 | Shieh | B25J 9/1692 700/254 |
| 2014/0067317 | A1 * | 3/2014 | Kobayashi | B25J 9/1697 702/153 |
| 2014/0229005 | A1 * | 8/2014 | Suzuki | B25J 9/1692 700/254 |

OTHER PUBLICATIONS

Abstract of EP2199036, dated Jun. 23, 2010, 2 pages.
Abstract of DE10150225, dated Apr. 17, 2003, 2 pages.

* cited by examiner

AUTOMATIC CALIBRATION METHOD FOR ROBOT SYSTEMS USING A VISION SENSOR

CROSS-REFERENCE TO RELATED APPLICATIONS

This application is a continuation of PCT International Patent Application No. PCT/IB2015/050707, filed Jan. 30, 2015, which claims priority under 35 U.S.C. § 119 to Chinese Patent Application No. 2014100471156, filed Feb. 11, 2014.

FIELD OF THE INVENTION

The present invention relates to a calibration method for a robot system, and more particularly, to an automatic calibration method for a robot system using a vision sensor.

BACKGROUND

Know calibration methods for robot systems generally involve artificial teaching. For example, an operator manually controls a robot of the robot system to move a tool mounted on the robot to reach the same target point with a plurality of different poses (for a 6-axis robot, generally with four or more different poses).

The operator must visually determine whether the tool is moved to the same target point, and consequently, calibration errors arise leading to inaccurate tool usage. Furthermore, it is extremely time-consuming to repeatedly manually control the robot to reach the same target point and visually verify the movement, greatly decreasing work efficiency. Moreover, the robot system must be re-calibrated every time a tool is replaced, adding to the time burden.

SUMMARY

An object of the invention, among others, is to provide an automatic calibration method for a robot system in which calibration is achieved with high precision and high efficiency. The disclosed automatic calibration method for a robot system includes the steps of calibrating a sensor and a sensor coordinate system of the sensor with respect to a world coordinate system, controlling a robot under the guidance of the sensor to move a point of a tool mounted on the robot to reach a same target point with a plurality of different poses, the point of the tool in a tool coordinate system, and calculating a transformation matrix $^{tcp}T_t$ of the tool coordinate system with respect to a tool center point coordinate system based on pose data of the robot at the same target point.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of an automatic calibration method for a robot system. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
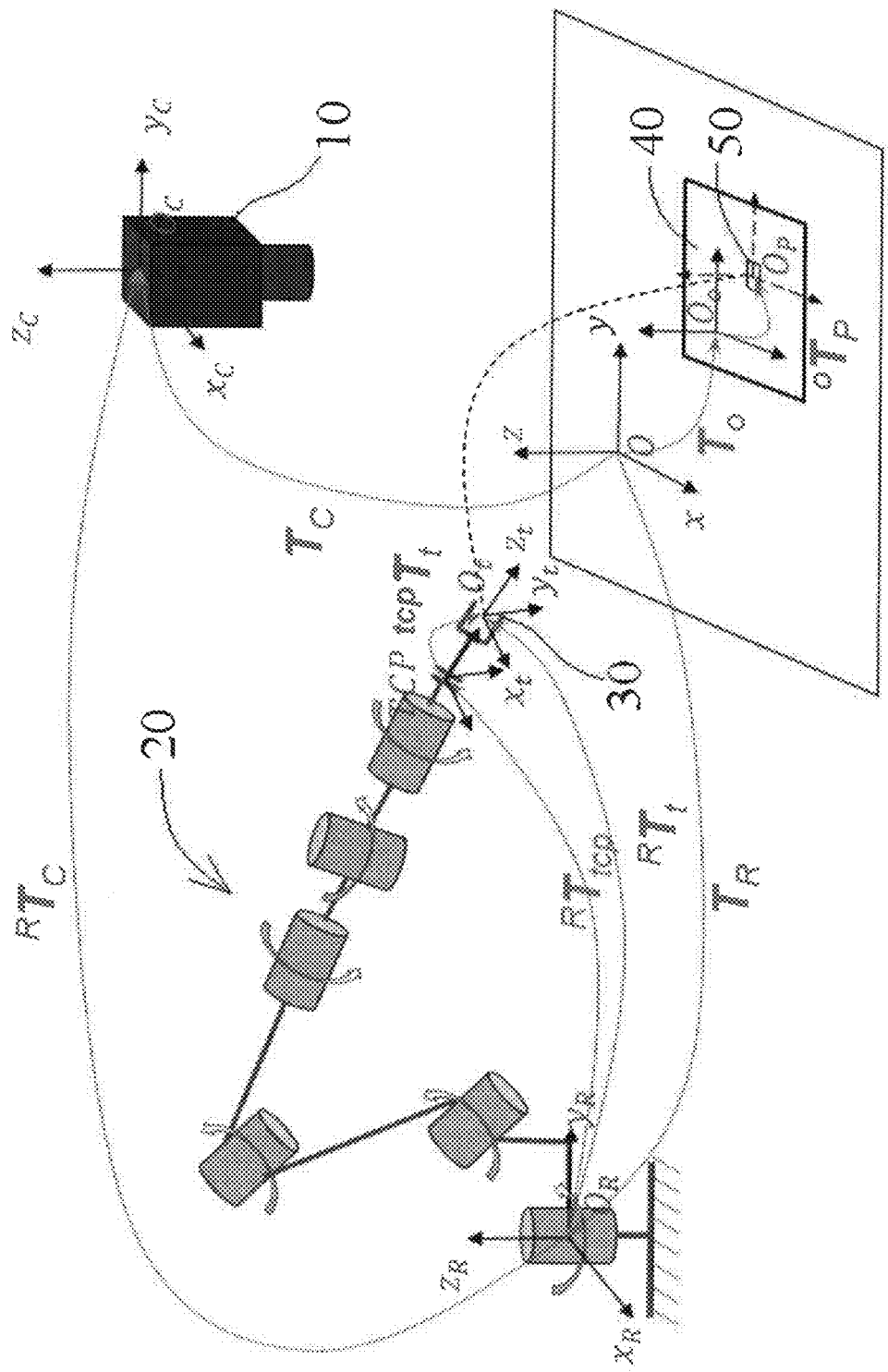
FIG. 1 is a schematic view of a robot system according to the invention.

A robot system according to the invention is shown in FIG. 1. The robot system has a sensor 10, a robot 20, a tool 30, a controller (not shown), and a processor (not shown). The major components of the invention will now be described in greater detail.

The sensor 10 may be a vision sensor, for example, a camera, or any other type of vision sensor known to those with ordinary skill in the art. The sensor 10 has intrinsic parameters including a focal length, a lens distortion, a pixel ratio, and a geometric relationship between a chip pose and a lens pose of the sensor 10. The sensor 10 is configured to capture an image of the tool 30, an object 40, and a target region 50 on the object 40, and identify pose (position and posture) data of the tool 30, the object 40, and the target region 50 based on the captured image.

The sensor 10 calibrates the robot system and guides the robot 20. Although only one sensor 10 is shown in the embodiment of FIG. 1, the robot system may comprise two or more sensors 10. In this case, one sensor 10 may be only used to calibrate the robot system, and the other sensor 10 may be used only to guide the robot 20. The sensor 10 may alternatively be another type of suitable sensor 10, for example a laser tracker.

The robot 20 in the shown embodiment is a 6-axis robot. One with ordinary skill in the art would understand that the robot may be any multi-freedom robot, for example, a four-axis robot or a five-axis robot. Although only one robot 20 is shown in the embodiment of FIG. 1, the robot system may comprise two or more robots 20.

The tool 30 may be any type of tool that can be mounted on the robot 20. The tool 30 is controlled by the robot 20 and is used to machine the object 40.

The controller (not shown) controls the robot system based on a pre-stored program.

The processor (not shown) processes the image data obtained by the sensor 10.

A plurality of coordinate systems are shown in FIG. 1, including a world coordinate system O, a camera coordinate system $O_c$, a robot coordinate system $O_R$, a tool center point coordinate system $O_{tcp}$, a tool coordinate system $O_t$, an object coordinate system $O_o$, and a target region coordinate system $O_P$. The tool center point ("TCP") mentioned herein refers to a center point of an end of the robot 20 on which the tool 30 is mounted, and the tool center point coordinate system $O_{tcp}$ correspondingly refers to a coordinate system of that end point of the robot 20.

Transformation matrices among these coordinate systems are also shown in FIG. 1, including a transformation matrix $T_c$ of the camera coordinate system $O_c$ with respect to the world coordinate system O, a transformation matrix $T_R$ of the robot coordinate system $O_R$ with respect to the world coordinate system O, a transformation matrix $^RT_{Tcp}$ of the tool center point coordinate system $O_{Tcp}$ with respect to the robot coordinate system $O_R$, a transformation matrix $^{TCP}T_t$ of the tool coordinate system $O_t$ with respect to the tool center point coordinate system $O_{Tcp}$, a transformation matrix $^RT_t$ of the tool coordinate system $O_t$ with respect to the robot coordinate system $O_R$, a transformation matrix $T_O$ of the object coordinate system $O_o$ with respect to the world coordinate system O, and a transformation matrix $^OT_P$ of the target region coordinate system $O_P$ with respect to the object coordinate system $O_o$. The transformation matrix $^RT_{Tcp}$ of the tool center point coordinate system $O_{Tcp}$ with respect to the robot coordinate system $O_R$ is a known aspect of the robot 20, and may be provided by the controller of the robot 20 or read from a teaching device of the robot 20.

The calibration process of the robot system will now be described generally with reference to FIG. 1. First, intrinsic parameters of the sensor 10 and the sensor coordinate system $O_c$ of the sensor 10 are calibrated with respect to a world coordinate system O. Calibration of the sensor 10 and sensor coordinate system Oc may be performed by any known means of calibration, including calibration by a calibration plate. Second, after the sensor 10 is calibrated, all transformation matrices $^{Tcp}T_t$, $T_R$, $^RT_t$, $T_O$, and $^OT_P$ are identified based on the calibrated sensor 10.

Identifying the transformation matrix $^{Tcp}T_t$ will now be described in greater detail.

First, a target point is defined in the world coordinate system O and recognized using the sensor 10.

Figure 2:
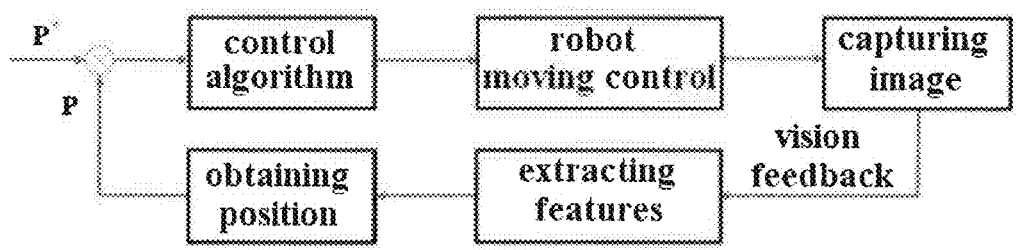
FIG. 2 is a block diagram of a closed-loop feedback control on a position of a tool of the robot system shown in FIG. 1.

Second, the robot 20 is automatically controlled by the controller under the guidance of the calibrated sensor 10 to move a point of the tool 30 in the tool coordinate system $O_t$ to reach the same target point with a plurality of different poses. In order to accurately move the point of the tool 30 to the same target point, closed-loop feedback control shown in FIG. 2 is performed on the robot 20 based on data from the calibrated sensor 10. As shown in FIG. 2, the robot 20 initially moves automatically under the guidance of a control algorithm executed by the controller to move the point of the tool 30. The sensor 10 then captures an image of the tool 30 in the world coordinate system O, processes the captured image to extract features of the captured image, and obtains the actual position of the tool 30 in the world coordinate system O based on the extracted features. The position error between the actual position P and the target position P* can then be obtained. Thereafter, the control algorithm automatically generates a control value, corresponding to the position error, to control the robot 20 until the position error between the actual position P and the target position P* becomes zero.

Third, the transformation matrix $^{tcp}T_t$ of the robot 20 is calculated based on pose data of the robot 20 at the same target point. Due to the closed loop feedback shown in FIG. 2, the point of the tool 30 in the tool coordinate system $O_t$ is accurately moved to the same target point, improving the recognition accuracy of the calculated transformation matrix $^{tcp}T_t$.

The robot system may need to frequently replace the tool 30. In this case, after the tool 30 is replaced by a new tool 30, the robot system automatically and immediately re-recognizes a transformation matrix $^{Tcp}T_t$ of the robot 20.

In an embodiment, the above process identifying the transformation matrix $^{Tcp}T_t$ may be repeated with a plurality of additional target points to improve the accuracy of the $^{Tcp}T_t$ matrix calculation. For instance, a second target point is defined in the world coordinate system O and recognized using the sensor 10. The robot 20 is controlled by the controller under the guidance of the calibrated sensor 10 by closed-loop feedback control to move the point of the tool 30 in the tool coordinate system Ot to reach the same second target point with a plurality of different poses. A second transformation matrix $^{tcp}T_t$ of the robot 20 is then calculated based on pose data of the robot 20 at the same second target point.

A difference between the first transformation matrix $^{tcp}T_t$ and the second transformation matrix $^{tcp}T_t$ is then compared to a predetermined allowable range. If the difference is outside the allowable range, the calculation of the transformation matrix $^{tcp}T_t$ is restarted. If the difference is within the allowable range, an average of the first transformation matrix $^{tcp}T_t$ and the second transformation matrix $^{tcp}T_t$ is used as the overall transformation matrix $^{tcp}T_t$.

This process can be repeated for 1 to N target points, obtaining N transformation matrices $^{tcp}T_t$. N may be an integer greater than or equal to 2. The overall transformation matrix $^{tcp}T_t$ may be calculated by applying the Least Squares Method to the N transformation matrices $^{tcp}T_t$. As the integer N increases the precision of the overall transformation matrix $^{tcp}T_t$ improves.

Identifying the transformation matrix $T_R$ will now be described in greater detail.

First, the transformation matrix $^RT_t$ is calculated based on the obtained transformation matrix $^{Tcp}T_t$ according to the following expression (1):

$$^RT_t = {}^RT_{Tcp} * {}^{Tcp}T_t \qquad (1)$$

Second, a target pose of the tool 30 is defined in the world coordinate system O and recognized by the sensor 10 to obtain a transformation matrix T of the recognized target pose with respect to the world coordinate system O.

Third, the robot 20 is controlled by the controller under the guidance of the sensor 10 to move the tool 30 to reach the recognized target pose. The transformation matrix $T_R$ is calculated based on the transformation matrix T of the recognized target pose with respect to the world coordinate system O and the calculated transformation matrix $^RT_t$, according to the following expression (2):

$$T_R = T * {}^RT_t^{-1} \qquad (2),$$

wherein $^RT_t^{-1}$ is an inverse matrix of $^RT_t$.

Figure 3:
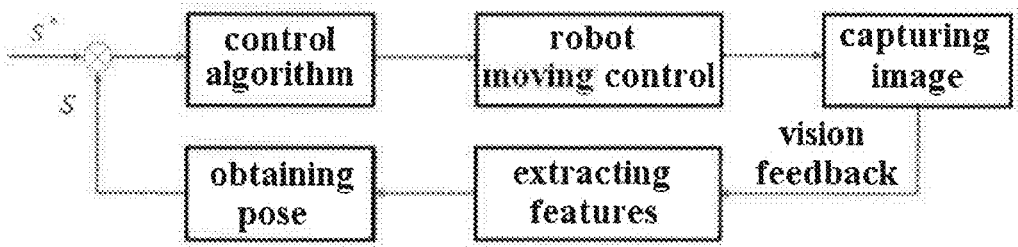
FIG. 3 is a block diagram of a closed-loop feedback control on a pose of the tool of FIG. 2.

In order to accurately move the tool 30 to the recognized target pose in the third step, closed-loop feedback control shown in FIG. 3 is performed on the robot 20 based on data from the calibrated sensor 10. As shown in FIG. 3, the robot 20 initially automatically moves under the guidance of the control algorithm executed by the controller to move the pose of the tool 30. The sensor 10 then captures an image of the tool 30 in the world coordinate system O, processes the captured image to extract features of the captured image, and obtains the actual pose of the tool 30 in the world coordinate system O based on the extracted features. The pose error between the actual pose S and the target pose S* can then be obtained. Thereafter, the control algorithm automatically generates a control value, corresponding to the pose error, to control the robot 20 until the pose error between the actual pose S and the target pose S* becomes zero.

The actual pose S may be pose information calculated based on the sensor 10 or pose data read from the sensor 10 space. There is a mapping relationship between the sensor space and the pose space, for example, s=L*p, wherein s refers to the pose data read from the sensor space, p refers to the actual pose data in the pose space, and L refers to a mapping matrix between the sensor space and the pose space. Thereby, the robot 20 may be controlled in the pose space, that is, a feedback signal S is a pose signal calculated based on the pose data read from the sensor 10. Alternatively, the robot 20 may be controlled in the sensor space, that is, a feedback signal S is a pose signal directly read from the sensor 10. The particular control algorithm for controlling the robot would differ between the sensor space and the pose space, but would have the same function in both spaces.

Identifying the transformation matrix $T_O$ will now be described in greater detail.

First, an image of the object 40 is captured by the calibrated sensor 10 and processed by the processor to obtain the object coordinate system $O_o$. Then, the transformation matrix $T_O$ of the object coordinate system $O_o$ with respect to the world coordinate system O can be obtained. Generally, the object 40 to be machined is fixed, and therefore, the pose of the object 40 with respect to the world coordinate system O is constant; the object coordinate system $O_o$ and the transformation matrix $T_O$ only need to be identified once. However, in some conditions, the object 40 to be machined is continuously or intermittently moving and the pose of the object 40 is continuously or intermittently variable. In these conditions, the transformation matrix $T_O$ and object coordinate system $O_o$ must be recalculated.

Identifying the transformation matrix $^{O}T_P$ will now be described in greater detail.

First, an image of the target region 50 on the object 40 is captured by the calibrated sensor 10 and processed by the processor to obtain the target region coordinate system $O_P$. Then, the transformation matrix $^{O}T_P$ of the target region coordinate system $O_P$ with respect to the object coordinate system $O_O$ can be obtained. Since the pose of the target region 50 in the object coordinate system $O_o$ is constant, the transformation matrix $^{O}T_P$ is constant.

Advantageously, in the automatic calibration method for a robot system according to the invention, the robot 20 can accurately move to the same target point with the plurality of different poses, improving the calibration accuracy of the robot system. Furthermore, the calibration of the robot system is automatically performed by the control algorithm, increasing the calibration efficiency, and simplifying the calibration operation.

What is claimed is:

1. An automatic calibration method for a robot system, comprising:
    calibrating a sensor and a sensor coordinate system of the sensor with respect to a world coordinate system;
    controlling a robot under the guidance of the sensor to move a point of a tool mounted on the robot to reach a same target point with a plurality of different poses, the point of the tool being in a tool coordinate system; and
    calculating a transformation matrix $^{tcp}T_t$ of the tool coordinate system with respect to a tool center point coordinate system based on pose data of the robot at the same target point.

2. The automatic calibration method for a robot system according to claim 1, wherein the calibrating step is performed by means of a calibration plate.

3. The automatic calibration method for a robot system according to claim 1, wherein the controlling step includes performing a closed-loop feedback control on the robot until a position error between an actual position of the point of the tool sensed by the sensor and a target position of the target point becomes zero.

4. The automatic calibration method for a robot system according to claim 3, further comprising calculating a transformation matrix $^{R}T_t$ of the tool coordinate system with respect to a robot coordinate system based on the transformation matrix $^{tcp}T_t$.

5. The automatic calibration method for a robot system according to claim 4, further comprising controlling the robot under the guidance of the sensor to move the tool to reach a known target pose by closed-loop feedback control, until a pose error between an actual pose of the tool sensed by the sensor and the target pose becomes zero.

6. The automatic calibration method for a robot system according to claim 5, further comprising calculating a transformation matrix $T_R$ of the robot coordinate system with respect to the world coordinate system based on a transformation matrix T of the known target pose with respect to the world coordinate system and the transformation matrix $^{R}T_t$.

7. The automatic calibration method for a robot system according to claim 6, further comprising determining a transformation matrix $T_O$ of an object to be machined by the tool with respect to the world coordinate system using the sensor.

8. The automatic calibration method for a robot system according to claim 7, further comprising determining a transformation matrix $^{O}T_P$ of a target region on the object with respect to an object coordinate system using the sensor.

9. The automatic calibration method for a robot system according to claim 8, wherein the transformation matrix $^{O}T_P$ is constant.

10. The automatic calibration method for a robot system according to claim 9, wherein a pose of the object with respect to the world coordinate system is constant.

11. The automatic calibration method for a robot system according to claim 9, wherein a pose of the object with respect to the world coordinate system is continuously variable.

12. The automatic calibration method for a robot system according to claim 1, wherein the sensor is a vision sensor or a laser tracker.

13. The automatic calibration method for a robot system according to claim 12, wherein the sensor is a camera having calibrated parameters including at least one of a focal length, a lens distortion, a pixel ratio, and a geometric relationship between a chip pose and a lens pose of the camera.

14. The automatic calibration method for a robot system according to claim 13, wherein the robot system has a plurality of cameras.

15. The automatic calibration method for a robot system according to claim 14, wherein the robot system has a plurality of robots.

16. The automatic calibration method for a robot system according to claim 13, wherein the camera visually guides the robot to machine an object.

17. The automatic calibration method for a robot system according to claim 1, further comprising re-identifying the transformation matrix $^{tcp}T_t$ automatically and immediately after the tool is replaced by a new tool.

18. An automatic calibration method for a robot system, comprising:
    calibrating a sensor and a sensor coordinate system of the sensor with respect to a world coordinate system;
    controlling a robot under the guidance of the sensor to move a point of a tool mounted on the robot to reach a same first target point with a first plurality of different poses, the point of the tool in a tool coordinate system;
    calculating a first transformation matrix $^{tcp}T_t$ of the tool coordinate system with respect to a tool center point coordinate system based on pose data of the robot at the first target point;
    controlling the robot under the guidance of the sensor to move the point of the tool to reach a same second target point with a second plurality of different poses;
    calculating a second transformation matrix $^{tcp}T_t$ of the tool coordinate system with respect to a tool center point coordinate system based on pose data of the robot at the second target point; and
    determining whether an error between the first transformation matrix $^{tcp}T_t$ and the second transformation matrix $^{tcp}T_t$ is within an allowable range, returning to the calibrating step if the error is not within the allowable range, and using an average of the first transformation matrix $^{tcp}T_t$ and the second transformation matrix $^{tcp}T_t$ as an overall transformation matrix $^{tcp}T_t$ if the error is within the allowable range.

19. An automatic calibration method for a robot system, comprising:
    calibrating a sensor and a sensor coordinate system of the sensor with respect to a world coordinate system;
    controlling a robot under the guidance of the sensor to move a point of a tool mounted on the robot to reach a plurality of target points with a plurality of different poses, the point of the tool being in a tool coordinate system;
    calculating a plurality of transformation matrices $^{tcp}T_t$ of the tool coordinate system with respect to a tool center point coordinate system based on pose data of the robot at the plurality of target points, each transformation matrix $^{tcp}T_t$ corresponding to one target point; and
    determining an overall transformation matrix $^{tcp}T_t$ by using the least squares method on the plurality of transformation matrices $^{tcp}T_t$.

20. The automatic calibration method for a robot system of claim 19, wherein the plurality of target points is at least three target points.

* * * * *